United States Patent [19]

Treise

[11] Patent Number: 4,555,704
[45] Date of Patent: Nov. 26, 1985

[54] RANGE REPLY SEARCH APPARATUS

[75] Inventor: Jan E. Treise, West Melbourne, Fla.

[73] Assignee: Rockwell International Corporation, El Segundo, Calif.

[21] Appl. No.: 441,454

[22] Filed: Nov. 15, 1982

[51] Int. Cl.⁴ .............................................. G01S 13/00
[52] U.S. Cl. .................................... 343/7.3; 343/13 R
[58] Field of Search ............................ 343/6.5 R, 7.3; 364/451, 561

[56] References Cited

U.S. PATENT DOCUMENTS 3,781,888  12/1973  Bail ......................................... 343/7.3
4,028,698  6/1977  Miller et al. ........................... 343/7.3

Primary Examiner—Thomas H. Tarcza
Assistant Examiner—Mark Hellner
Attorney, Agent, or Firm—Bruce C. Lutz; Robert C. Mayes; H. Fredrick Hamann

[57] ABSTRACT

Apparatus for searching for range indicating pulse signals received as part of distance measuring equipment which first form a list of distance indications in a first search time. The distance indications obtained in a second search time are then logically combined with those indications in the first list and any combination that results in a difference value of less than a prescribed amount is retained for list updating purposes until there is only a single distance indication left in the list. The apparatus can then change to a track mode by placing a search window around the single distance indication thereby reducing the amount of extraneous information to be manipulated by the receiving apparatus.

6 Claims, 3 Drawing Figures

RANGE REPLY SEARCH APPARATUS

THE INVENTION

This invention is generally concerned with electronics and more specifically concerned with distance measuring equipment. More specifically, the present invention is concerned with a method of ascertaining the distance between a moving object and a stationary transmitter which receives a "query" signal and responds with a reply signal to all queries in the same manner.

Distance measuring equipment (DME) has used various forms of detection equipment for sorting out the response from a ground station to a given airplane's query from a plurality of responses and deleting all other responses to other airplanes' queries. A normal approach at one time was to start with the first received pulse in time after the transmission of the query pulse and use correlation techniques with several successive queries. If said correlation techniques did not produce a satisfactory result then the next received pulse in time would be correlated. Since the correlation attempts occurred on a systematic and sequential basis, the time taken to achieve synchronization could become quite extensive if the distance from the ground station was considerable and there were a multiplicity of other airplanes in the area also seeking the same type of distance information.

The DME systems mentioned above were originally used in an analog servo mechanism to provide range readout displayed on a meter. Such a system had the disadvantages of long search times and inherent inaccuracies due to analog circuit drift. To overcome this last problem of long search time, interrogation rates were increased but analog errors still persisted. With the advent of digital logic, the analog servo was replaced by a digital servo thereby eliminating errors due to analog components.

A further improvement was presented in a patent awarded to Narco Scientific as shown in U.S. Pat. No. 3,781,888 wherein the digital servo was replaced with a shift register fast search method. The decoded reply pulses in this method are placed in a shift register and correlated between search periods. The system, however, did not track range but merely searched and reacquired range each time the distance moved by one shift register bit. This last mentioned system had very short search times but did not track range and also appeared "jumpy" at high velocities.

To overcome the above deficiencies, the present invention, in the search mode, takes range data from a range counter whenever a pulse pair is detected as being received subsequent to the sending of a query pulse. This range data is placed in a FIFO (first in, first out) stack which acts as a buffer between the input and the range processor to create a "full" list. A second query pulse is then sent and as input data is received, this data is correlated against the "full" list. Whenever a suitable match is found, the list is updated until there is only a single match remaining.

The system then uses this single match, in a tracking mode, as part of tracking the distance. On each occasion of obtaining a match, the error between a distance register and the input data is checked. If a suitable match occurs, "hit" or "miss" counters are adjusted. If the input data is greater than the tracking distance, a "range passed" flag (range exceeded) is set to inhibit further comparisons. Normally, the error indication is used to correct the tracking distance in the direction of the received data.

It is thus an object of the present invention to provide an improved system for detecting and correlating a given response to a query from a plurality of responses, the others of which are propagated in response to queries by other sources.

Other objects and advantages may be ascertained from a reading of the specification and appended claims in conjunction with the drawings wherein:

FIG. 1b is a continuation of the block flow diagram of FIG. 1a; and

DETAILED DESCRIPTION

Figure 1A:
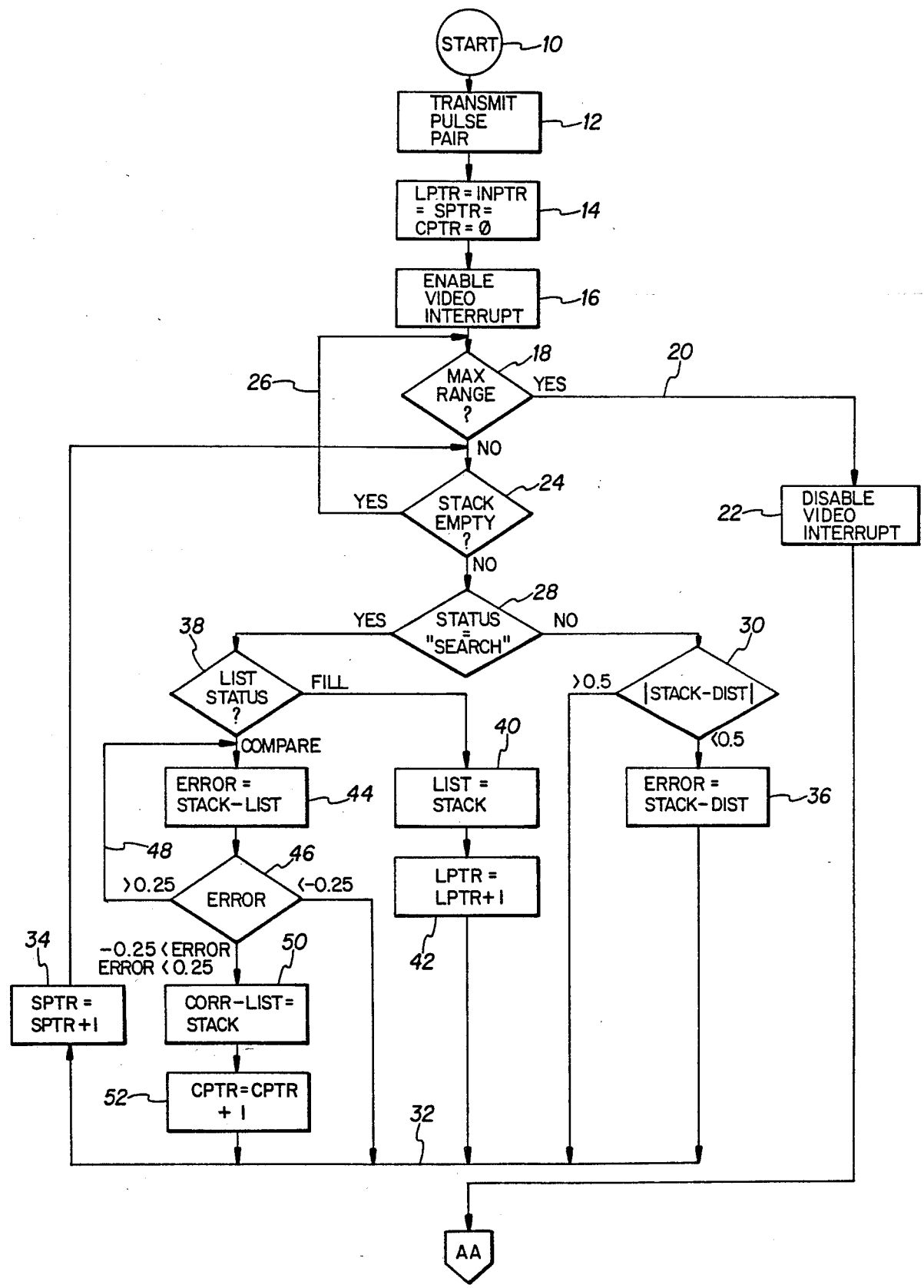
FIG. 1a is a block diagram flow chart of the approach taken by a computer in practicing the present invention.

In FIG. 1a a START block 10 is shown actuating a TRANSMIT PULSE PAIR block 12 to an omnidirectional source of reply signals. After the transmission, a block 14 is actuated so as to set the list pointer (LPTR), the input pointer (INPTR), the stack pointer (SPTR) and the correlation pointer (CPTR) to 0. The VIDEO INTERRUPT is then enabled in block 16 and a decision block 18 is then actuated to determine whether or not the range is at a maximum. If the range is at a maximum, a signal is supplied on a lead 20 to a DISABLE VIDEO INTERRUPT block 22 which actuates the flow diagram of FIG. 1b. If the range is less than maximum, a decision block 24 is actuated to see whether or not the stack is empty. If the stack is empty, a return is made via lead 26 to the maximum range decision block 18. If the stack is not empty, a decision block 28 checks to see whether the STATUS register is indicative of the apparatus being in a SEARCH mode. If it is not in a SEARCH mode, the distance register value is subtracted from the stack distance and the result is listed as an absolute value. If this absolute value is greater than 0.5 miles, the decision block 30 supplies signals to a lead 32 which increments the stack pointer (SPTR) in block 34 and returns to the input of decision block 24. On the other hand, if the difference is less than 0.5 miles, the ERROR term is set to the difference between the stack range and the DISTANCE REGISTER in block 36. In either event, the stack pointer (SPTR) is incremented in block 34 and the process is repeated until the maximum range is reached and no more items are left in the stack. If, on the other hand, the STATUS equaled "SEARCH" in decision block 28, a decision block 38 is actuated to check whether the LIST STATUS is "FILL" or "COMPARE". If it is FILL, the LIST register equals whatever distance is in the stack as illustrated in block 40 and the list pointer (LPTR) is incremented in 42. This process is repeated until the list contains all of the items received via the stack. If, on the other hand, the LIST STATUS is in the COMPARE mode, the difference between the stack range and the list range is computed. If this difference is more than 0.25 miles, the next list item is selected as indicated by lead 48 and the comparison is made with that list range. If the difference is less than −0.25 miles, the stack range is much less than the next list range so no action is taken and the stack pointer (SPTR) is merely incremented in block 34. If, however, the absolute value as computed is less than 0.25 miles, the stack range is placed in the correlation list (CORR LIST) as a match in block 50 and the correlation list pointer (CPTR) is incremented in block 52 to the next available location. These comparisons and computations in the "COMPARE" mode to obtain range indication which remain in the list may be termed "logically combining" for the purpose of the claim language. As will be noted, in each instance of completion of the decisions in FIG. 1a, except for that from DISABLE VIDEO INTERRUPT 22, the stack pointer (SPTR) is incremented in block 34 to point to the next stack item (if one is present) and the decision processes are repeated until the maximum range is reached and no more items are left in the stack.

Figure 1B:
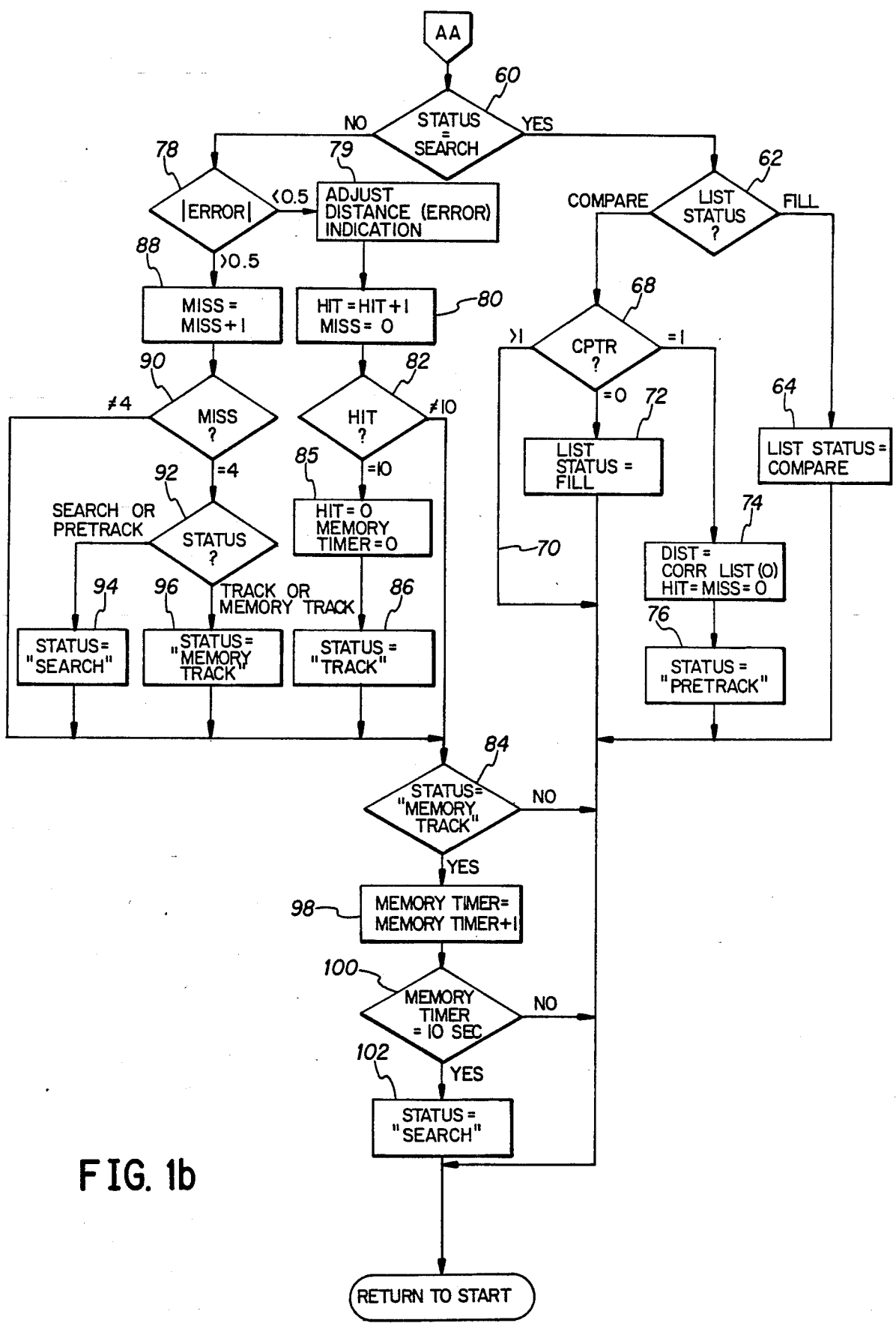

Once the maximum range has been reached, the DISABLE VIDEO INTERRUPT 22 passes the signal to the STATUS equals "SEARCH" decision block 60 in FIG. 1b. If STATUS equals "SEARCH", the LIST STATUS decision block 62 is actuated to see if the LIST STATUS is in the "FILL" or "COMPARE" mode. If a list was filled on the previous epoch, the LIST STATUS is changed to "COMPARE" in block 64 and the apparatus returns to the start mode to transmit a new pulse pair. If, however, the LIST STATUS is in the "COMPARE" mode or epoch, the correlation list pointer (CPTR) is checked in a decision block 68 to see how many correlations resulted from the COMPARE procedure. If there was more than one match as indicated on line 70, the STATUS register is unchanged and the next comparison will be made from the results of this comparison. If there were no successful comparisons, the LIST STATUS register is changed to the "FILL" mode as indicated in block 72 and a new set of lists will be collected and the entire process repeated. If, on the other hand, the number of successful comparisons is 1, the distance register is set to the range at the top of the correlation list (CORR LIST) (the only successful comparison) and the HIT and MISS counters are reset to 0 as shown in block 74. Also, the STATUS is set to "PRETRACK" in block 76. The "PRETRACK" status is used when a valid distance has resulted from the comparison but has not yet been verified by a preset number of successful checks. Again, the apparatus returns to the START block 10 whereby a further pulse pair is transmitted. If the STATUS in decision block 60 is not "SEARCH", the value of the ERROR term is checked in decision block 78 to determine whether a successful comparison was made with the distance register. If the absolute value of the ERROR is less than 0.5 miles, the distance register value is updated in the direction of the received range in block 79. The error term is used to correct the value in the distance register to "track" the received range. A filter in the apparatus produces a range rate or, in other words, ground speed, which may be displayed to a system operator such as a pilot. The miss register (MISS) is reset to 0 in block 80 and the hit register (HIT) is incremented. The hit register (HIT) value is checked in decision block 82 and if the value therein is less than 10 the decision block 84 is actuated. If the STATUS register is not "MEMORY TRACK", a further pulse pair is sent. When the number of hits equals 10, the distance has been verified and the hit register (HIT) and MEMORY TIMER register are reset to 0 in block 85 and the STATUS is set to "TRACK" in block 86. Since this would not result in the STATUS being "MEMORY TRACK", the decision block 84 is exited and another pulse pair is sent. Returning to decision block 78, if the ERROR was greater than an absolute value of 0.5, the miss register (MISS) is incremented in block 88 and this register is checked in decision block 90 to see whether the value therein is equal to or less than 4. If the value is less than 4, the decision block 84 is reached. If the miss register (MISS) equals 4, the decision block 92 checks the condition of the STATUS register. If it is in "SEARCH" or "PRETRACK", the STATUS is set to "SEARCH" in block 94. On the other hand, if the STATUS is in "TRACK" or "MEMORY TRACK", the STATUS is set to "MEMORY TRACK" in block 96. If the STATUS is "MEMORY TRACK" when the apparatus reaches the decision block 84, the MEMORY TIMER is incremented in block 98 and decision block 100 checks to see if the MEMORY TIMER indication has reached 10 seconds. If it has not reached 10 seconds, another pulse pair is transmitted, but if it has reached 10 seconds, block 102 sets the STATUS register to "SEARCH" since the apparatus has failed to find a valid range indication and the procedure starts from the beginning.

Figure 2:
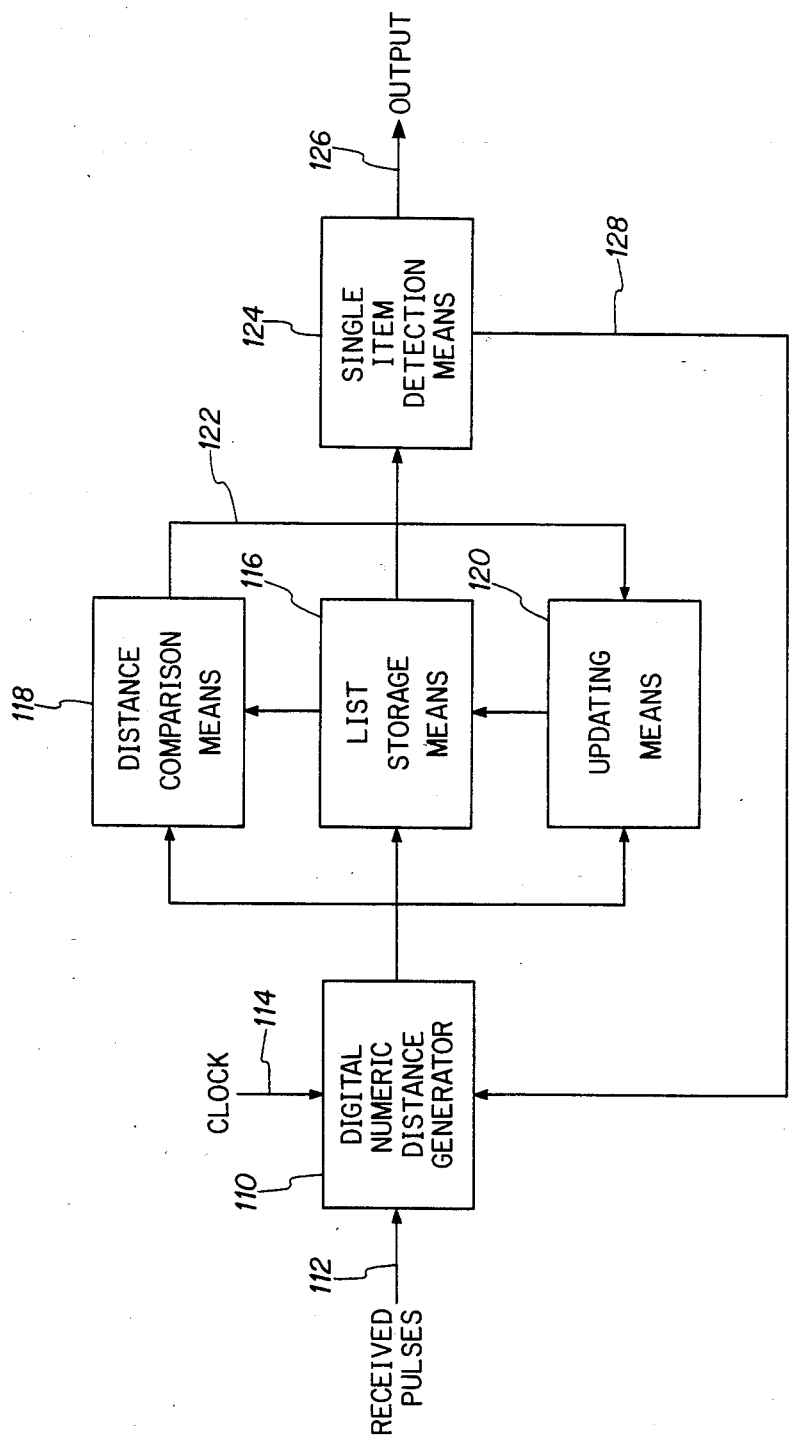
FIG. 2 is a block diagram of the portion of the circuit which forms a list and then removes items from the list if there is no correlation of that distance in later signal receipt time periods until there is only one left on the list by this iterative process.

In FIG. 2 a block 110 receives signals indicative of returned signals before a maximum range is reached on lead 112. The generator 110 also receives a clock signal on lead 114 so that it will know when to commence calculating times which are sent out to a list storage means 116. Information is also sent to a distance comparison means 118 and to an updating means 120. After the list is initially composed, the distance comparison means 118 checks the signals received on the next iteration with those in the list of 116 and provides an output on 122 to the updating means 120 for keeping a list only of those which correlate within a predetermined amount of time to those on the first list. The process continues until a single item in the list of 116 is detected by block 124 which outputs a signal indicative of this distance indication on lead 126 and outputs the signal on lead 128 to the generator 110 that it no longer need repeat the process because the proper distance has apparently been ascertained.

OPERATION

In the present invention a multipurpose digital computer is used to (1) initiate the transmission of a pulse pair to a ground transmitting station and (2) receive indications of all subsequent inputs received which "could" be responsive to the transmitted pulse pair over a given time range. On the basis of correlation techniques between the potential distance indications received in the first round of a search sequence and those received in subsequent rounds, a given distance indication is selected by the computer as probably being the appropriate distance response. This distance is then verified in a "PRETRACK" STATUS to make sure that it is subsequently received within prescribed tolerance limits and then this indication is used in a "TRACK" mode to provide distance indications to an operator such as an airplane pilot. In the "TRACK" mode, the computer prescribes a window of time as being the only time that the computer will react to incoming distance indicating signals. The computer is capable of calculating the ERROR between the presently received distance indication and the previously received indication to update the old information and to obtain an indication of velocity relative the ground station. Such a system operates in accordance with the flow diagram previously discussed in the Detailed Description. This flow diagram is outlined in a different format in the pseudocode sequences listed infra.

| MAIN SEQUENCE |
| --- |
| TRANSMIT PULSE PAIR |
| LPTR = INPTR = SPTR = CPTR = 0 |
| ENABLE VIDEO INTERRUPT SUBROUTINE |
| DO UNTIL MAXIMUM RANGE |
| DO WHILE STACK NOT EMPTY |
| IF STATUS = "SEARCH" THEN |
| CALL SEARCH SUBROUTINE |
| ELSE |
| IF ABS (STACK (SPTR) - DISTANCE) < 0.5 MILES THEN |
| ERROR = "STACK" (SPTR) − "DISTANCE" |
| SPTR = SPTR + 1 |
| END DO |
| END DO |
| DISABLE VIDEO INTERRUPT |
| IF STATUS = "SEARCH" THEN |
| CALL SEARCH RESULT |
| ELSE |
| CALL TRACK RESULT |
| END MAIN |

The basic software of the referenced computer operates as two different concurrent processes. The first or ranging process takes the real time range data from a receiver range counter whenever a pulse pair is detected as being received. This range data is placed in a first in first out (FIFO) stack which acts as a buffer between the real time input process and the slower range processing software. This input process is set forth in the Video Interrupt Sequence set forth infra.

| VIDEO INTERRUPT SEQUENCE |
| --- |
| IF STACK NOT FULL THEN |
| STACK (INPTR) = "INPUT RANGE" |
| INPTR = INPTR + 1 |
| END VIDEO INTERRUPT |

The ranging process runs concurrently with the real time input process. When the FIFO stack contains a range to be processed, the STATUS register is checked for the "SEARCH" mode. If the unit is in the "SEARCH" mode, the LIST STATUS is checked as shown in the Search Subroutine. If there is an empty list, the status will indicate a "FILL" (i.e., not "COMPARE") mode. In this mode the stack items are simply copied to the list to fill the list. As each entry is placed in the list, the list pointer (LPTR) is incremented to point to the next available list location.

| SEARCH SUBROUTINE |
| --- |
| IF LIST STATUS = "COMPARE" THEN |
| REPEAT UNTIL ERROR < 0.25 MILES |
| ERROR = "STACK" (SPTR) − "LIST" (LPTR) |
| END REPEAT |
| IF ERROR > −0.25 MILES THEN |
| CORR LIST (CPTR) = "STACK" |
| CPTR = CPTR + 1 |
| ELSE |
| LIST (LPTR) = "STACK" (SPTR) |
| LPTR = LPTR + 1 |
| END SEARCH |

If the LIST STATUS indicates the "COMPARE" mode, the difference between the stack range and the list range is computed. If this distance is more than +0.25 miles, the next list item is selected and the comparison is made with that list range. If the distance is less than −0.25 miles, the stack range is much less than the next list range so no action is taken with this stack range. If the absolute value of the error term is less than 0.25 miles absolute, the stack range is placed in the correlation list (CORR LIST) as a match and the correlation list pointer (CPTR) is incremented to the next available location. If STATUS is not "SEARCH", the ELSE under the "DO WHILE STACK NOT EMPTY" is called forth so that the absolute value of the distance register (the distance being tracked) and the stack range is computed. If this value is less than 0.5 miles, the error term is set to the difference between the stack range and the distance register. After processing the stack range, the stack pointer (SPTR) is incremented to point to the next stack item (if one is present) and the DO UNTIL MAXIMUM RANGE process is repeated until the maximum range is reached and no more items are left in the stack.

At this point, the results of the SEARCH and TRACK procedures must be evaluated. If the STATUS is "SEARCH" the Search Result Subroutine is called and the routine is as set forth infra.

| SEARCH RESULT SUBROUTINE |
| --- |
| IF LIST STATUS = "COMPARE" THEN |
| IF CPTR = 0 THEN |
| LIST STATUS = "FILL" |
| IF CPTR = 1 THEN |
| DISTANCE = CORR LIST (0) |
| STATUS = "PRETRACK" |
| HIT = MISS = 0 |
| ELSE |
| LIST STATUS = "COMPARE" |
| END SEARCH RESULT |

The LIST STATUS is checked to see whether this was a "FILL" or "COMPARE" epoch. If the list was filled on the previous epoch, the LIST STATUS is changed to "COMPARE" under the ELSE statement of the Search Result Subroutine. The process then returns to the Main Sequence. However, if it was a "COMPARE" epoch, the CPTR is checked to determine how many correlations resulted from the "COMPARE" procedure. If there was more than one match, the STATUS is unchanged and the next comparison will be made using the results of this comparison and the process will return to the Main Sequence. If, however, there were no successful comparisons (CPTR=0) the LIST STATUS is set to "FILL" and a new set of lists will be collected and the entire process repeated since again the process will return to the Main Sequence. If the number of successful comparisons was 1 (CPTR=1) the distance register is set to the range set forth in the correlation list. This, of course, was the only successful comparison. At this time, the STATUS is set to "PRETRACK" and the HIT and MISS counters are reset to 0. The "PRETRACK" status is used when a valid distance has resulted from the comparison but still has not been verified. Again, the process returns to the Main Sequence.

If the STATUS is not "SEARCH", the ELSE clause will call forth the Track Result Subroutine. In this subroutine, the ERROR term is checked to determine whether a successful comparison was made with the distance register. If the absolute value of the ERROR is less than 0.5 miles, (in other words, it is not greater than 0.5 miles) a successful comparison is indicated and the ELSE statement is invoked. In this instance, the ERROR term is used to correct the distance register to track the received range. The ERROR term may also be filtered to produce range rate or ground speed, since the ERROR term indicates range displacement over a period of time equal to the time between interrogations. This range rate may be scaled to units of nautical miles per hour and displayed to the pilot. The HIT counter is incremented and the MISS counter is reset to 0. The value of the HIT counter after being incremented is then checked and if it is 10 the HIT and MEMORY TIMER registers are reset to 0 while the STATUS is set to "TRACK". This action is for the purpose of indicating that the distance has been verified. If the ERROR value found is greater than 0.5 miles thus indicating a "miss", the MISS counter is incremented. If after being incremented, the MISS counter is at a value of 4, the STATUS is set to "SEARCH" if it has been anything other than "TRACK" or "MEMORY TRACK". The other options in this case being either "SEARCH" or "PRETRACK". However, if the STATUS is "TRACK" or "MEMORY TRACK", the STATUS is set to "MEMORY TRACK".

If the STATUS is not "MEMORY TRACK", the Track Result Subroutine ends and the process returns to the Main Sequence. If, however, the STATUS is "MEMORY TRACK", the MEMORY TIMER is incremented. When the MEMORY TIMER reaches 10 seconds, the STATUS is set to "SEARCH" and the process returns to the Main Sequence.

---

TRACK RESULT SUBROUTINE

IF ABS (ERROR) > 0.5 MILES THEN
MISS = MISS + 1
IF MISS = 4 THEN
IF STATUS = "TRACK" OR "MEMORY TRACK" THEN
STATUS = "MEMORY TRACK"
ELSE
STATUS = "SEARCH"
ELSE
ADJUST DISTANCE INDICATION USING "ERROR"
HIT = HIT + 1
MISS = 0
IF HIT = 10 THEN
HIT = MEMORY TIMER = 0
STATUS = "TRACK"
IF STATUS = "MEMORY TRACK" THEN
MEMORY TIMER = MEMORY TIMER + 1
IF MEMORY TIMER = 10 SECONDS THEN
STATUS = "SEARCH"
END TRACK RESULT

---

A review of the above description of the pseudocode for the ranging and real time input sequences will show that it applies on the same basis to the flow charts illustrated in the figures.

The equipment is thus able to take a given set of potential signal responses after transmission of a query, use multiple match correlation techniques to see which potential reply signal consistently occurs in a given "window" of time until a single reply is left. By then, placing the unit in a "pretrack" condition in maintaining the same window, the apparatus can "verify" that the indication is correct. After verification, this same window and the same reply can then be used in a track or ranging mode to provide a distance indication to the operator or pilot. This is a distinct improvement both in the time of detecting a probably appropriate reply signal and in using substantially the same circuitry and window producing techniques to track a distance indication once detected.

While a given flow diagram and pseudocode has been presented to illustrate the concept of the present invention, it is to be realized that other approaches to obtaining a specific solution to the problem will readily occur to those understanding the present disclosure. Thus, I wish to be limited not by the scope of the apparatus and process disclosed but rather by the scope of the appended claims wherein I claim.

I claim:

1. The method of searching for range indicating pulse signals received as part of distance measuring equipment (DME) comprising, the steps of:

forming a list of computed numeric distance indications, over a first predetermined period of time, corresponding to times of receipt of a first set of pulse signals from a signal source;

logically combining computed numeric distance indications, obtained over a second predetermined period of time and corresponding to times of receipt of a second set of pulse signals from said signal source, with those distance indications in said list to produce difference result values;

updating said list of computed numeric distance indications to include only those computed numeric distance indications, obtained from said second set of pulse signals, that are instrumental in producing logical result values that are less than a predetermined absolute value; and repeating said combining and updating until there is only one distance indication left in said list.

2. Apparatus for searching for range indicating pulse signals received comprising, in combination:

first means for forming a list of computed numeric distance indications, over a first predetermined period of time, corresponding to times of receipt of a first set of pulse signals from a signal source;

second means for producing computed numeric distance indications, obtained over a second predetermined period of time, corresponding to times of receipt of a second set of pulse signals from said signal source;

third means, connected to said first and second means, for logically combining computed numeric distance indications in said list with computed numeric distance indications from said second set of pulse signals to produce difference result values;

fourth means, connected to said first and third means, for updating said list of computed numeric distances to include only those computed numeric distance indications, from said second set of pulse signals, producing logical result values that are less than a predetermined absolute value; and fifth means, connected to said first means, for repeating said producing, combining and updating until there is only one computed numeric distance indication left in the list.

3. The method of processing received range indicating pulse signals comprising, the steps of:

forming a list of computed numeric distance indications, obtained over a first predetermined period of time, corresponding to times of receipt of a first set of pulse signals from a signal source;

producing computed numeric distance indications, obtained over a second predetermined period of time, corresponding to times of receipt of a second set of pulse signals from said signal source;

logically combining computed numeric distance indications, obtained from the second set of pulse signals, with those computed numeric distance indications in said list to produce difference result values;

updating said list of computed numeric distance indications to include only those computed numeric distance indications, obtained from said second set of pulse signals, producing logical result values that are less than a predetermined absolute value; and repeating said producing, combining and updating until there is only one computed numeric distance indication left in the list.

4. Apparatus for searching for range indicating pulse signals received from an omnidirectional source which source is also responding to other range means comprising, in combination:

first means for forming a list of numeric distance indications, over a first predetermined period of time, corresponding to times of receipt of a first set of pulse signals from a signal source;

second means, connected to said first means, for logically combining numeric distance indications, obtained over a second predetermined period of time and corresponding to times of receipt of a second predetermined period of time and corresponding to times of receipt of a second set of pulse signals from said signal source, with those numeric distance indications in said list to produce difference result values;

third means, connected to said first means, for updating said list of numeric distance indications to include only those numeric distance indications, from said second set of pulse signals, that are instrumental in producing logical result values that are less than a predetermined absolute value; and fourth means, connected to said second means, for repeating said combining and updating until there is only one numeric distance indication left in said list.

5. Search apparatus for distance measuring equipment comprising, in combination:

first means for receiving a set of reply pulses from a source, one of which reply pulses are indicative of the distance from said source to said apparatus;

second means for storing numbers, each obtained as a receipt time of a reply pulse relative a reference time, to form a list;

third means for receiving a further set of pulses from said source;

fourth means, connected to said third means, for generating numbers each obtained as a receipt time of a reply pulse relative a reference time;

fifth means, connected to said second means and to said fourth means, for comparing the numbers generated by said fourth means with the stored numbers in the list formed by said second means and substituting for the numbers previously on the list a new set of numbers which new set of numbers are within a predetermined range of specific numbers previously on the list; and sixth means, connected to said third means for repeating the comparing of numbers until only one number remains in the list.

6. The method of providing both search and track modes in the same apparatus comprising, the steps of:

receiving a set of reply pulses from a source, one of which reply pulses are indicative of the distance from said source to said apparatus;

storing numbers, each obtained as a receipt time of a reply pulse relative a reference time, to form a list of numbers;

receiving a further set of pulses from said source;

generating numbers each obtained as a receipt time of a reply pulse relative a reference time;

comparing the numbers generated by said generating means with the stored numbers in the list formed by said storing means and substituting for the numbers previously on the list a new set of numbers which new set of numbers are within a predetermined range of specific numbers previously on the list;

repeating the comparing of numbers until only one number remains in the list; and establishing a track mode window for said receiving means around the distance represented by the remaining number in the list of said storing means whereby reply pulses outside said window are ignored by the system in the track mode.

* * * * *